United States Patent
Ji et al.

(10) Patent No.: US 8,229,442 B1
(45) Date of Patent: Jul. 24, 2012

(54) DERIVATION OF MINIMUM COVERAGE OF CELLULAR SECTORS WITH CELLULAR-SITE SPATIAL DENSITY AND APPLICATION SPECIFIC DATA

(75) Inventors: Zhengrong Ji, Sunnyvale, CA (US); Michael Jesse Chu, Los Altos Hills, CA (US); Adel Amin Youssef, Santa Clara, CA (US); Arunesh Mishra, Mountain View, CA (US); Steven John Lee, San Francisco, CA (US); Ravi Jain, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 12/491,807

(22) Filed: Jun. 25, 2009

(51) Int. Cl.
*H04W 40/00* (2009.01)
(52) U.S. Cl. ............ 455/446; 455/456.1; 455/456.5
(58) Field of Classification Search ........... 455/446, 455/456.1–456.6; 342/357.13
See application file for complete search history.

(56) References Cited

U.S. PATENT DOCUMENTS

| | | | |
|---|---|---|---|
| 6,006,095 A * | 12/1999 | Bernardin et al. | 455/446 |
| 2003/0003918 A1 * | 1/2003 | Proctor et al. | 455/446 |
| 2004/0104841 A1 * | 6/2004 | Syrjarinne | 342/357.13 |
| 2004/0106410 A1 * | 6/2004 | Choi et al. | 455/446 |
| 2005/0239478 A1 * | 10/2005 | Spirito | 455/456.1 |
| 2006/0227745 A1 * | 10/2006 | Olvera-Hernandez et al. | 370/331 |
| 2008/0096578 A1 * | 4/2008 | Lin et al. | 455/456.1 |
| 2009/0011779 A1 * | 1/2009 | MacNaughtan et al. | 455/456.6 |
| 2010/0178925 A1 * | 7/2010 | Bernini et al. | 455/446 |

* cited by examiner

*Primary Examiner* — Jean Gelin
*Assistant Examiner* — Nathan Taylor
(74) *Attorney, Agent, or Firm* — Sterne, Kessler, Goldstein & Fox P.L.L.C.

(57) ABSTRACT

Systems and methods for estimating the minimum geographic coverage of a wireless base station. In an embodiment, the present invention estimates coverage by (1) receiving real-time wireless base station information from the mobile device; (2) extracting a set of location points and system specific information based on the real-time wireless base station information; (3) determining a coverage area based on the set of location points and the system specific information; (4) adjusting for errors based on various factors (5) storing the determined coverage area.

13 Claims, 14 Drawing Sheets

System Specific Information 210
- Cell ID (CID)
- Cell Global Identity (CGI)
- Mobile network code (MNC),
- Mobile country code (MCC),
- Location area code (LAC)

Example Physical Information 220
- Geographic Coordinates
- Elevation
- Antenna Height
- Azimuth Angle
- Sector Beam Width
- Transmission Power

140

630 $R_d \approx \sqrt{\dfrac{TotalArea \cdot NumOfCarriers \cdot CellOverlapAvg}{\pi \cdot NumOfCells}}$ 640 $w_R = 1 - \dfrac{1}{1+e^{-\beta\left(\sqrt{p}-P\right)}}$ 650 $w_\alpha = (1-w_R)\left\{1-e^{-\dfrac{\left(R_\alpha/\delta - \gamma\right)^2}{2\sigma^2}}\right\}\left\{1-e^{-\dfrac{\left(R_d/R_\alpha - \lambda\right)^2}{2\varphi^2}}\right\}$ 660 $w_\delta = \gamma(1 - w_R - w_\alpha)$ 670 $R_e = \delta / \sqrt{p}$

FIG. 6

610 $R = (w_\delta \cdot \delta) + (w_\alpha \cdot R_\alpha) + (w_R \cdot R_d)$

620 $R + R_e = adjusted\_radius$

600

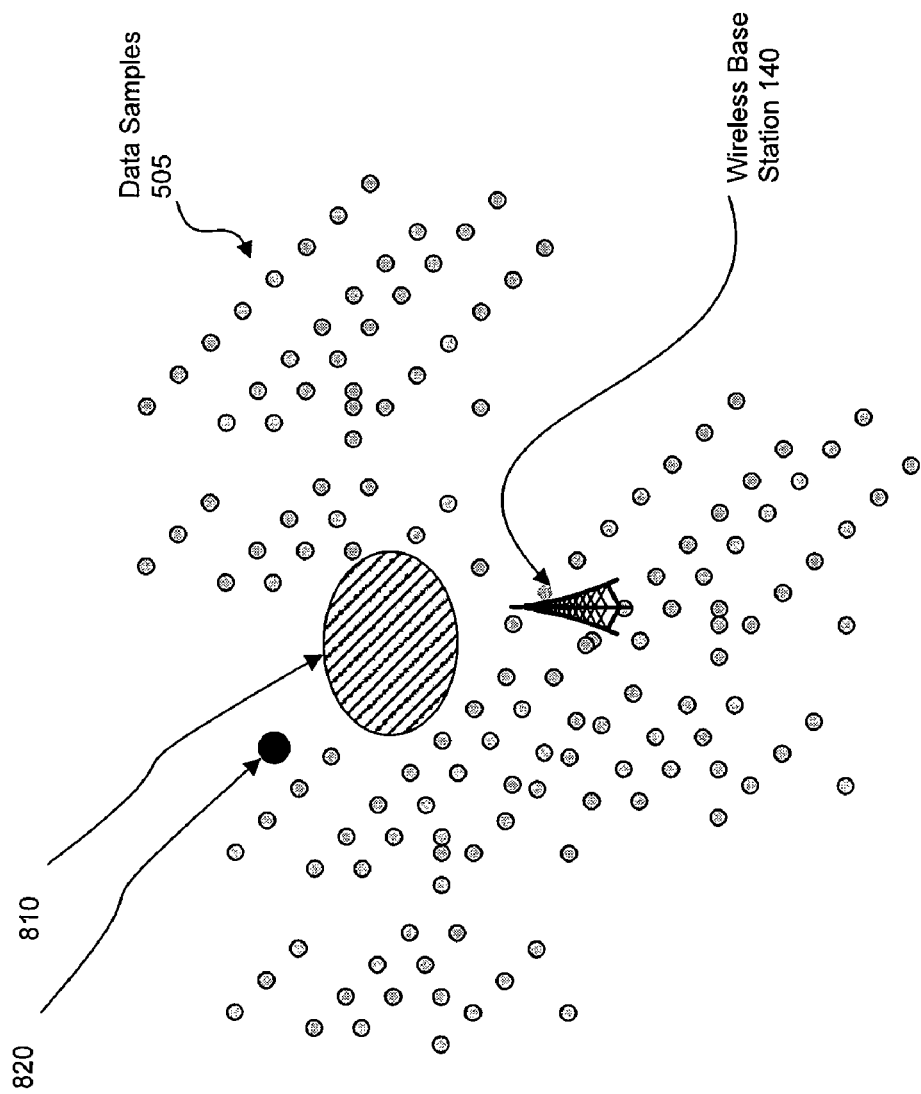

DERIVATION OF MINIMUM COVERAGE OF CELLULAR SECTORS WITH CELLULAR-SITE SPATIAL DENSITY AND APPLICATION SPECIFIC DATA

FIELD OF THE INVENTION

The present invention relates to estimating wireless coverage. More particularly, it relates to estimating the wireless coverage of a cellular sector.

BACKGROUND OF THE INVENTION

To facilitate proper navigation, many mobile wireless devices use on-board global positioning system (GPS) technology. GPS technology allows each mobile wireless device to calculate its geographical location by communicating with satellites or other reference points, such as, for example, wireless base stations. However, for those mobile wireless devices that do not have a GPS component or other method of determining geographic location, useful mobile services are severely limited. In addition, even in phones with GPS capability, devices may frequently have their location determination capabilities interrupted by so-called "urban canyons" or other obstructions.

To address these problems, systems and methods have been determined for enabling a cell phone to estimate its geographic location without having a GPS component, embodiments of this being described by Ji et al. in U.S. patent application Ser. No. 12/323,921, filed Nov. 26, 2008, entitled "Systems and Methods for Estimating Location Using CID and Application Specific Data" which is incorporated herein by reference in its entirety (hereinafter "'921 Application"). Knowing the geographic area corresponding to the minimum radio coverage of a cellular site may increase the accuracy of this non-GPS location estimation. As used herein, cellular sites correspond to cell site, wireless base station, base station, cellular transceiver, cell antenna, cell tower and other like terms known in the art. As used herein, a cellular sector corresponds to cell, cell sector, cell zone, wireless coverage area, service area, coverage region and other terms known in the art describing the radio coverage area of a cell site.

Information regarding the geographic coverage area of various wireless base stations is usually only available to mobile service providers that operate the wireless base stations or other related entities. Further, even mobile service providers may not have knowledge of the geographic coverage area of many wireless base stations outside of their own networks.

Many different approaches exist to determine the coverage area of cellular sites, but these approaches are generally only able to be performed by the cellular service providers, and are generally based on non-public, physical characteristics of the cellular site. Current approaches to estimating cell site minimum coverage area rely upon certain physical characteristics of the cell site, including the cell site's precise location, elevation, antenna height, antenna azimuth angle, sector beam width and transmission power. Generally, these physical characteristics and the determined minimum coverage information are not made available to the public.

For at least these reasons, it has been difficult to get complete information on the coverage area of various cell sites. Estimated geographic wireless coverage information is needed for any geographical region of interest regardless of which mobile service provider is providing coverage.

BRIEF SUMMARY

Embodiments of the present invention relate to the derivation of minimum coverage of cellular sectors with cellular-site spatial density and application specific data. According to an embodiment, an apparatus for determining a minimum coverage area of a wireless base station includes a coverage area determiner that receives data samples from mobile devices, such coverage area determiner determining the minimum coverage area of a wireless base station using location information from the data samples, and a storage device coupled to the coverage area determiner that stores the received data samples and the determined coverage area. The coverage area determiner may further include a coverage area metric determiner to determine coverage area metrics about a wireless base station, and a metric weight determiner that determines weights for each metric, such coverage area metrics being further used by the coverage area determiner to determine the minimum coverage area of a wireless base station.

According to another embodiment, a method for determining, with a processor, the minimum geographic coverage area for a wireless base station is provided. The method includes receiving data samples from mobile devices. The method further includes receiving a derived centroid from a centroid determiner, such centroid corresponding to an estimate of the location of the wireless base station. The method further includes determining, using the processor, coverage area metrics from the data samples. The method further includes determining, using the processor, a minimum geographic coverage area for the wireless base station based on the coverage area metrics. The method further includes storing the determined coverage area to a storage device.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 6 is a listing of equations used according to an embodiment of the present invention.

FIG. 8 depicts terrain features, data samples and a wireless base station according to an embodiment of the present invention.

I. Overview
II. The Network
III. Data Acquisition and Initial Analysis
   a. Samples Collected
   b. Centroid Determination
IV. Circular Coverage Radius Estimation
   a. Coverage Area Metric Determiner
     i. Regional Cellular Coverage Radius Metric—$R_d$
     ii. Standard Error Metric—$\delta$
     iii. Percentile Radius Metric—$R_\alpha$
   b. Determining Weights for Each Metric
   c. Determining the Estimated Radius R for a Specific Cell Site
V. Coverage Adjustment
   a. Coverage Adjustment Based on Estimated Centroid Error
   b. Coverage Adjustment Based on Terrain
VI. Example Computer System Implementation
VII. Conclusion

DETAILED DESCRIPTION OF EMBODIMENTS

The present invention relates to estimating the minimum coverage of cellular sectors. The minimum coverage of a cellular site may be determined based on data obtained from one or more mobile devices.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for estimating location of a mobile device in greater detail.

I. OVERVIEW

Embodiments described herein estimate a geographical area corresponding to a minimum radio coverage of a cell site in a wireless cellular network. Instead of returning a single geographical coordinate, the results of embodiments described herein may be a circle (or other appropriate shape) that best matches the geographic region covered by the base station transceiver of the cellular sector. Returned results may be determined with the highest level of accuracy allowed by the given samples.

Embodiments herein determine minimum wireless coverage based on data obtained from one or more mobile devices. The privately held information about a cell site, as described above, e.g., physical characteristics of the site, are not required by embodiments to derive a minimum wireless coverage. The use of data samples, and the multiple estimate metrics used by embodiments are described further below.

II. THE NETWORK

Figure 1A:
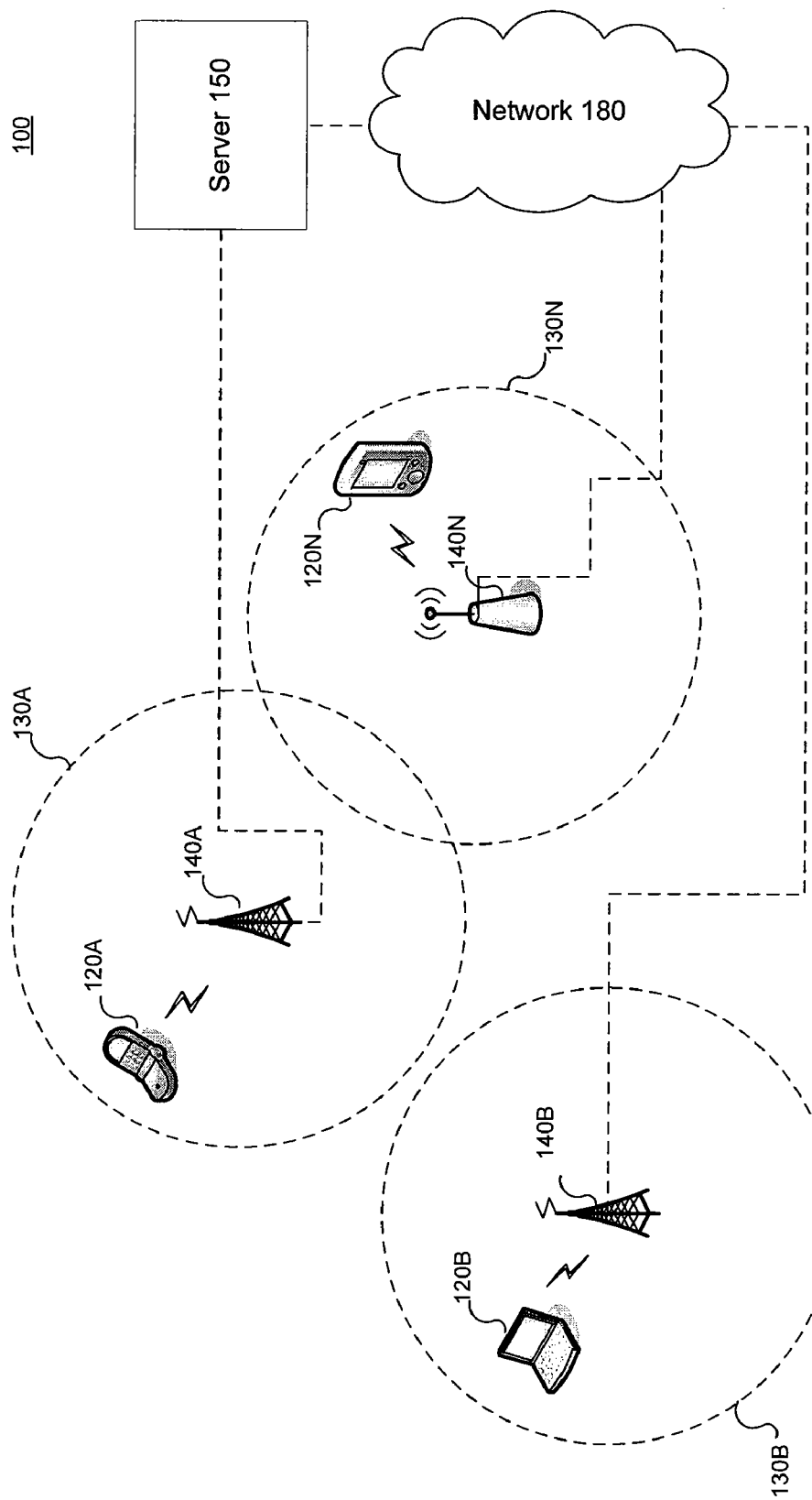
FIG. 1A is an architecture diagram of a system suitable for estimating the minimum geographic coverage of a wireless base station in an embodiment of the present invention.

FIG. 1A illustrates a conceptual representation of cellular network 100.

Network 100 comprises various mobile devices 120A-N and wireless base stations 140A-N. Network 100 may be a GSM, TDMA or a CDMA technology enabled mobile network or any form of wireless network (e.g. IEEE 802.11, Bluetooth or other Wi-Fi networks) or a combination of wired and wireless networks. Although in the following description, GSM networks are used as an example, it is to be noted that the description is not limited to GSM networks. Although three mobile devices and three wireless base stations are illustrated for exemplary purposes, network 100 may comprise any number of mobile devices and wireless base stations. Network 100 may be used to transmit and receive signals including but not limited to Wi-Fi, Bluetooth, or cellular signals. In an example, each device associated with network 100 may transmit and receive data (packets) according to a known protocol in a segment (channel) of allotted portion the spectrum (frequency band). For instance, the IEEE 802.11 series of protocols specifies the format of various types of packets which may be transmitted in preset channels of the spectrum, such as the ISM band located in the 2.4 GHz frequency range or the public safety band located in the 4.9 GHz frequency range.

Mobile devices 120A-N may include any device that is configured to exchange any form of data over a wireless network. Each mobile device 120A-N may communicate with wireless base stations 140A-N. Wireless base stations 140A-N may allow mobile devices 120A-N to communicate over network 100 or any other network connected to network 100. In an embodiment, passive radio location technology may enable device 120A-N users to determine their approximate location (e.g., metropolitan area, or latitude and longitude data) without GPS capability. Passive radio location technology, in certain implementations, may avoid the so-called urban-canyon and inside-the-building problems that may prevent GPS technology from functioning. As referenced above, passive radio technology is described further in the '921 Application.

Each wireless base station 140A-N may be a form of radio receiver or transmitter that serves as a hub of network 180. Each wireless base station 140A-N may also be the gateway between a wired network and network 100, or any other network and network 180. In an embodiment, each wireless base station 140A-N may be a Wi-Fi router or any other form of wireless communication hub. In another example, wireless base station 140A-N may be a wireless router that may support one or more client devices, while some wireless base stations may act as signal repeaters. In coverage region 150A for example, mobile device 120A uses wireless base station 140A to send and receive data.

Figure 1B:
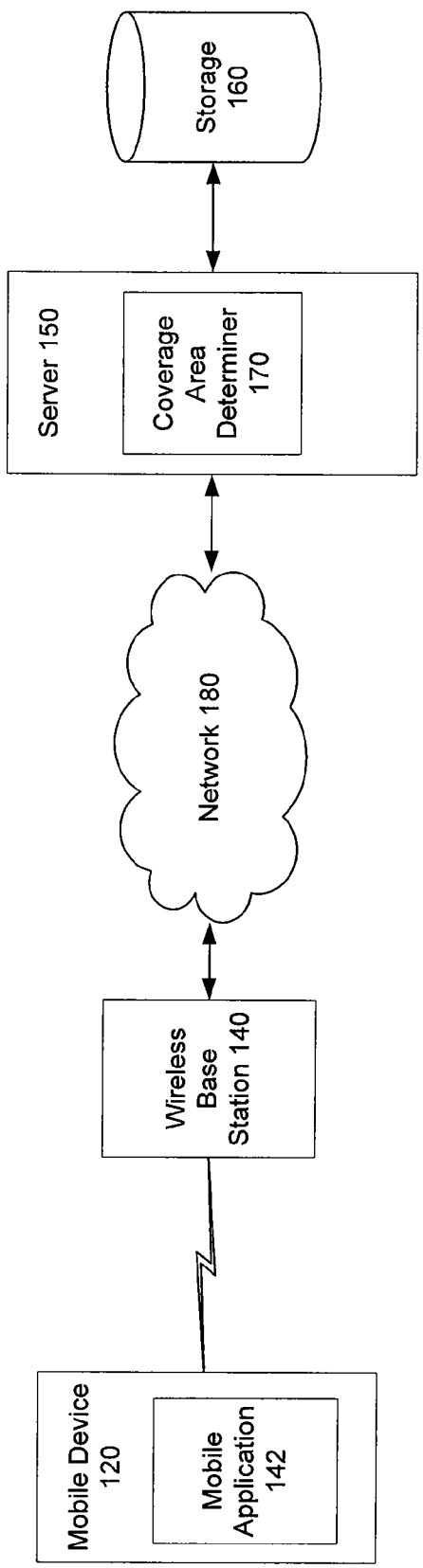
FIG. 1B is a more detailed diagram of the components of the system in FIG. 1A according to an embodiment of the present invention.

FIG. 1B depicts wireless base station 140, as shown in FIG. 1A as wirelessly connected to mobile device 120. Server 150 is communicatively coupled to network 120 and storage 160. Each of server 150 and storage 160 may be implemented on one or more computing devices. Such computing devices may include, but are not limited to, a personal computer, a mobile device such as a workstation, mini-computer, clustered computer system, and an embedded system. Such computing devices may also include, but are not limited to, a device having one or more processors and memory for executing and storing instructions. Such a computing device may include software, firmware, and hardware. Software may include one or more applications and an operating system. Hardware can include, but is not limited to, a processor, memory and graphical user interface display. As discussed in descriptions of FIG. 9 below, the embodiments described herein may be implemented using hardware, software or a combination thereof and may be implemented in a computer system or other processing system.

Server 150 and storage 160 may be implemented on one or more connected computing devices at the same or at different locations. For instance, server 150 and storage 160 may be remote from one another on different computing devices coupled to a network, such as network 180. In still another example, server 150 and storage 160 may be implemented on one or more computing devices at a common location and coupled to a mobile device 120 over network 180. Other combinations and configurations for server 150 and storage 160 may be used as would be apparent to a person skilled in the art given this description. Computer implementations of described embodiments will be discussed further in the description of FIG. 13.

Mobile device 120 may include a mobile application 142. Mobile application 142 for example, may be an application that uses mobile location information, e.g., 142 may be a mapping application or a proximity enabled restaurant selection application. Mobile application 142 may send data over network 180 to server 150 via wireless base station 140 and receive a response from server 150 via wireless base station 140. Server 150 may also initiate communication with mobile application 140 through network 180 via wireless base station 140. As an example, mobile application 142 may utilize GPS technology in mobile device 120 to determine an estimated location for the wireless device 120 upon which it is executed. Mobile application 142 may then send this location information via wireless base station 140, through network 180 to server 150. In embodiments described herein and as described below, coverage area determiner 170 may receive this location data directly or indirectly from mobile application 142.

III. DATA ACQUISITION AND ANALYSIS

As would be apparent to a person skilled in the relevant art, data acquisition of various pieces of information and corresponding locations from wireless devices may be accomplished using various techniques. An example of this type of data acquisition described in the '921 Application referenced above. Other approaches to data acquisition of information and corresponding location information from wireless devices would be apparent to a person skilled in the relevant art.

Referring to FIG. 1B, the data samples collected by mobile application 142 may be forwarded via wireless base station 140 to network 180. Network 180 may be any network or combination of networks that may carry data communication. Such network 180 may include, but is not limited to, a local area network, medium area network, and/or wide area network such as the Internet. Network 180 may support protocols and technology including, but not limited to, World Wide Web protocols and/or services. Intermediate web servers, gateways, or other servers may be provided between components of system 100 depending upon a particular application or environment. In an embodiment, the data samples are forwarded to server 150, for example a computing device or collection of computing devices. Server 150 executes a set of modules, collectively referred to herein as a coverage estimator 170. Other modules with different functions may also be executing on, or connected to server 150. As shown in FIG. 1B, server 150 is also coupled to storage 160.

Figure 1C:
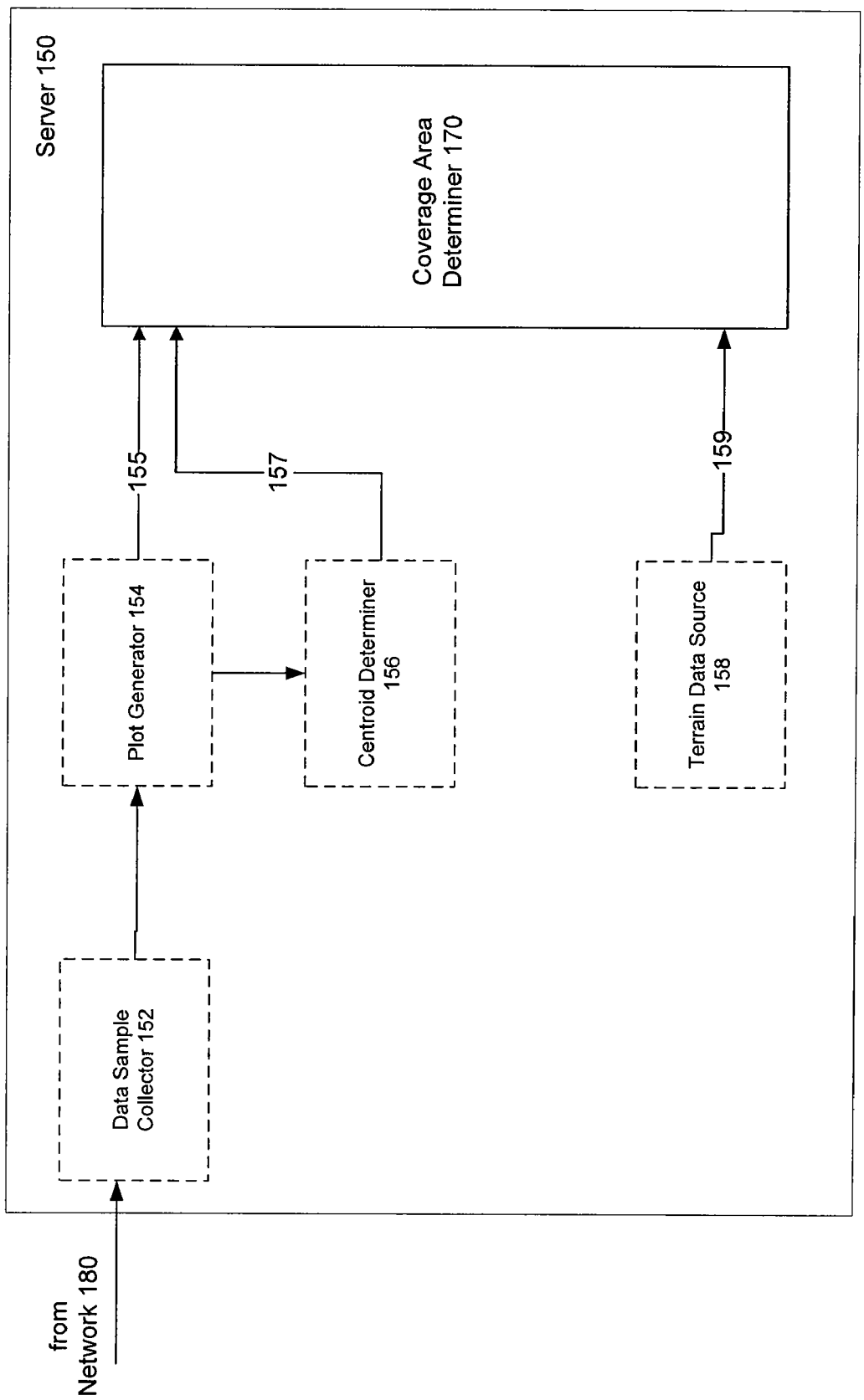
FIG. 1C is a diagram of a server connected to a network, such server executing several components, wherein the components can be embodied as described herein.

FIG. 1C illustrates server 150, coverage area determiner 170 and other modules that may collect the data, plot it and perform additional analysis, as detailed below. As would be apparent to a person skilled in the relevant art, the collection and plotting of various pieces of information and corresponding locations from wireless devices may be accomplished using various techniques, as further described for example in the '921 Application, referenced above. Embodiments may collect data samples from network 180 with data sample collector 152. After this collection, using one approach with certain embodiments, the samples may be plotted for location analysis by plot generator 154. From the plot generator 154, the plotted data samples 155 may be forwarded both to a centroid determiner 156 and to the coverage area determiner 170.

Additionally, as described below, data regarding terrain 159 in relevant geographic areas may be forwarded from a terrain data source 158. As would be apparent to a person skilled in the relevant art, there are many different terrain sources available to supply this information, two such being Google Earth or Google Maps software from Google Inc. The use of this terrain data is covered further in the discussion of FIG. 8.

a. Samples Collected

In various embodiments described herein, the data collected by mobile device 120 include both system specific and application specific data. These two terms describe two types of data that could be collected and are described further herein. These descriptions are not meant to limit the types or amount of data that could be collected or used by embodiments.

Figure 2:
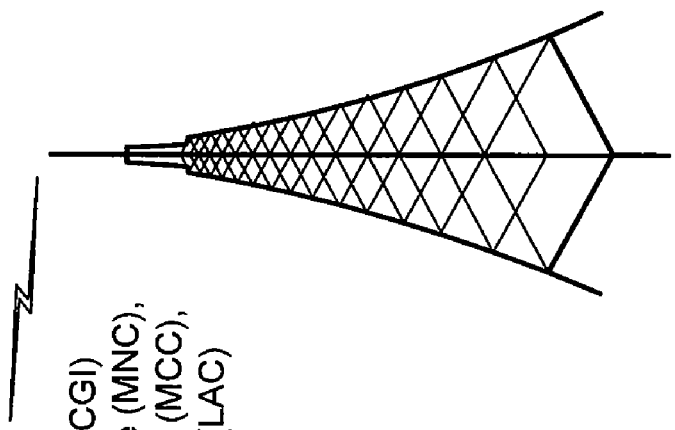
FIG. 2 is a description of system specific information about a wireless base station and physical information describing a sample wireless base station.

"System specific information," as used by embodiments herein, includes public information that describe a wireless site, that is transmitted wirelessly from wireless base station 140 to mobile device 120. As shown in FIG. 2, two examples of this system specific information 210 are Cell Global Identity (CGI), and CID (CID), which are identification codes that may globally uniquely identify a base station. Additional system specific information includes mobile device parameters such as a mobile network code (MNC), mobile country code (MCC), location area code (LAC) and CID. For example, CID may be an identifier assigned to a wireless base station 140A-N in network 100. An "active neighbor set" may also be transmitted, this data describing the active cell sites neighboring the mobile device 120. Such information is commonly exposed to mobile device applications through the system Application Program Interfaces (APIs), through mobile applications, especially those applications that benefit from a location service, e.g., mapping. This API exposure facilitates the acquisition and collection of this system specific information.

System specific information does not include the physical information 220 about the cell site mentioned in the Background above, for example the cell site's precise location and elevation, antenna height and azimuth angle, sector beam width and transmission power. Some of this information may be publicly available, as in a cell site's location and antenna height, but the collection of this information for each cell site to be analyzed may require excessive effort. Other information is commonly kept private by cell carriers, and may only be known by the cellular system operator, such as the cell site's transmission power, azimuth angle and sector beam width.

The application specific data, as used by embodiments described herein, includes location estimation readings from the wireless device. Such location information may be determined by GPS if the mobile device 120 has GPS support, or by passive radio location as described in the '921 Application. Location may also be estimated by location information specific to a mobile application—such a center of the view of a map or navigation application as its being used or other like data. The application specific data is collected and reported at the same time as the system specific information (CGI, CID, for example) so that they may be correlated with each other in the resulting data set.

In one implementation, in this data acquisition phase, a database of cellular ID information and corresponding location information for wireless base station 140A-N may be created and maintained. In a collection event, one or more data samples are obtained at server 150 from one or more mobile device(s) 120A-N. In embodiments, the data samples are correlated sets of both application specific information, e.g., location information, and system specific information, e.g., CID. In embodiments where a mobile device is GPS enabled, the application specific portion of a data sample may contain an indication of the mobile device's estimated GPS location. In another embodiment as described in the '921 Application, passive radio may be used to estimate location by scanning and decoding control channel information embedded in wireless signals. In still another embodiment, location information may be estimated from the center coordinates of a map in a mapping application, e.g., a user may be centered on a particular spot because they are interested in the location, and this interest may correlate with their actual location at that moment.

In an example, data samples may be stored on the mobile devices 120A-N until the data may be uploaded to server 150 and the location calculation may be performed by server 150. In this manner, the electronic device does not need to have additional memory storage space for maintaining a database of location information for CIDs.

The distribution of the data samples may vary greatly. Popular destinations that attract a large number of people in need of certain types of wireless device applications may have a larger sample size. For example, at a popular tourist destination, more people may be from out of town and more likely to be unfamiliar with the area, thus having an increased need for mapping applications. In embodiments, these applications, beyond giving the user map info, may also send data samples to embodiments of data collector 152 described herein.

In an embodiment. the data collection may happen randomly for each cell site, and is biased by the actual pattern of people using particular mobile applications. For example, map or navigation based mobile applications 142 tend to collect data when the user is in open areas like the sidewalk or in the street. Alternatively, certain location-based queries and location enhanced gaming applications often collect data from within buildings. As would be known by one skilled in the relevant art, the type of mobile application from which a sample is collected may affect the statistical confidence associated with the sample.

In an example, as discussed above, FIG. 1C shows plot generator 154 forwarding plotted location data 155 to centroid determiner 156. These are data samples, plotted on a two dimensional plane, based on the geographical location of mobile devices 120A-N at a time of initiation of a collection event at server 150.

b. Centroid Determination

In an embodiment, centroid determiner 156 may estimate a centroid from the collected data samples, such centroid representing an estimated geographical coordinate for a wireless base station. Examples of types of centroid determination are described in U.S. Non-Provisional patent application Ser. No. 12/323,622, filed on Nov. 26, 2008, entitled "Wireless Base Station Location Estimation" which is incorporated herein by reference in its entirety.

One approach to centroid determination involves calculating an average value of all the x co-ordinates of a data sample and the y co-ordinates of the data sample. The average x and y co-ordinate values are the co-ordinates of the centroid. The x and y' co-ordinates may also be latitude and longitude values respectively. Another approach to determining a centroid could involve bypassing the estimation step by the use of the known coordinates of the base station. As with other items of physical information about a cell site however, this known location is not required for embodiments described herein.

This determined centroid coordinate, as an estimate of the location of the wireless base station, will be used below by the coverage area determiner 170 to determine the minimum geographic coverage of a samples wireless base station.

IV. CIRCULAR COVERAGE RADIUS ESTIMATION

Figure 10:
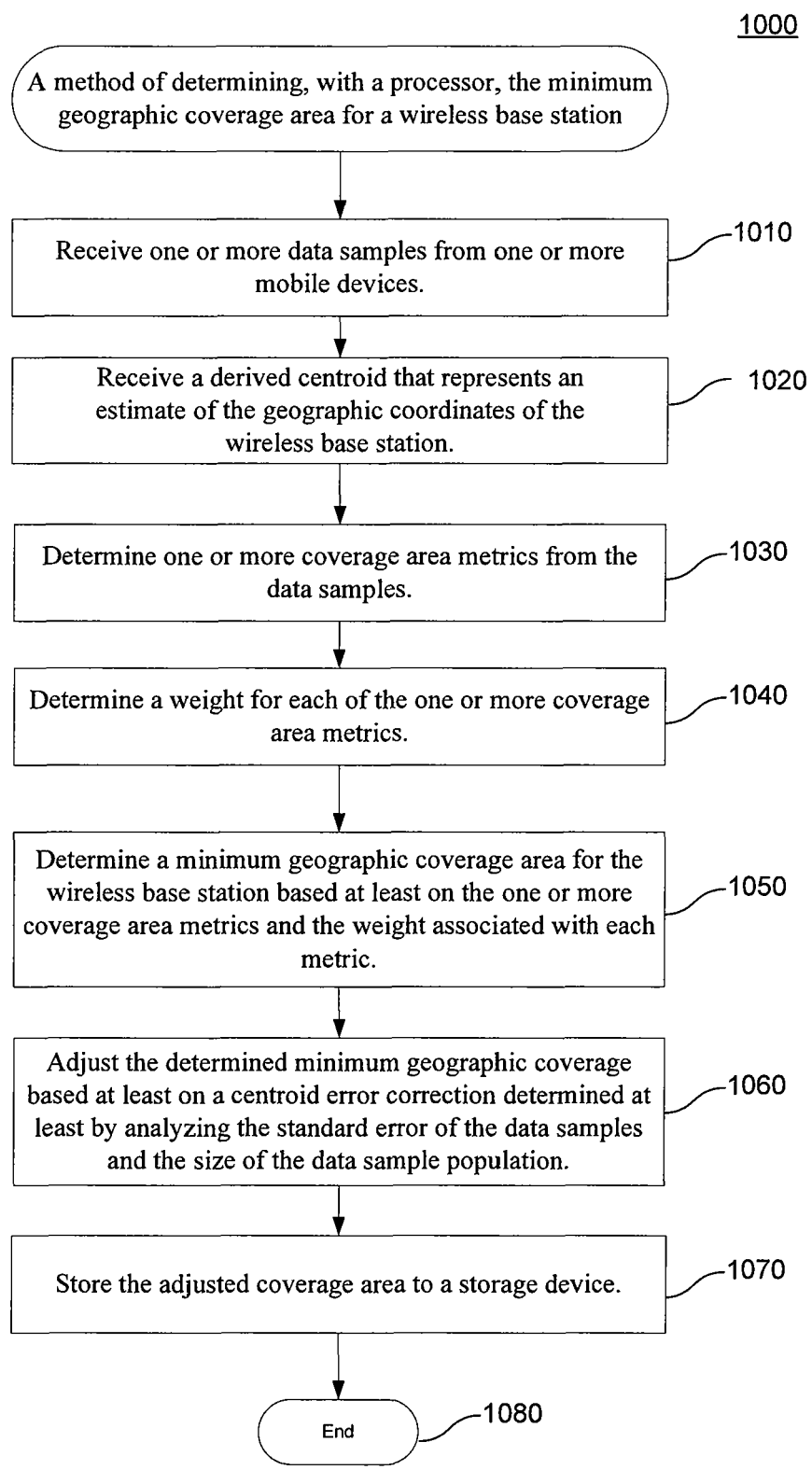
FIG. 10 is a diagram that shows a computer-implemented method for determining, with a processor, the minimum geographic coverage area for a wireless base station according to an embodiment of the present invention.

According to a further embodiment, FIG. 10 is a flowchart depicting a computer-implemented method for determining, with a processor, the minimum geographic coverage area for a wireless base station according to an embodiment of the present invention For brevity, method 1000 is described below with reference to coverage area determiner 170 but is not necessarily intended to be limited to the structure of coverage area determiner 170, nor should coverage area 170 be necessarily construed to limit the stages of method 1000.

Figure 3:
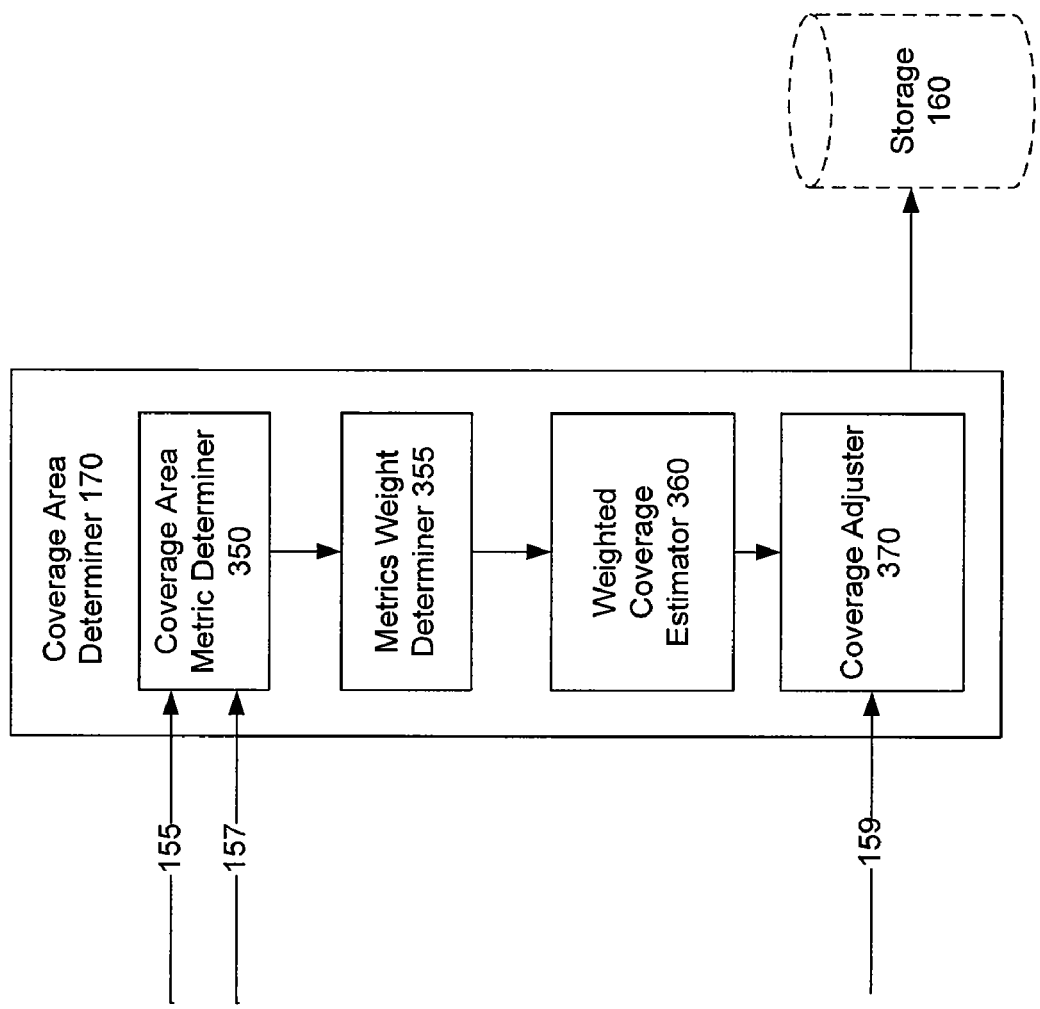
FIG. 3 is a more detailed diagram of the components of a coverage area determiner according to an embodiment of the present invention.

As shown in FIG. 3, coverage area determiner 170 comprises a coverage area metric determiner 350, a metrics weight determiner 355, a weighted coverage estimator 360 and a coverage adjuster 370. Coverage area estimator 170 is communicatively coupled to storage device 160. In embodiments, as discussed above, coverage area metric determiner 350 receives data samples 155 from plot generator 154, and a determined centroid 157 from centroid determiner 156.

After data acquisition, coverage area determiner 170 has received one or more sets of location points from one or more mobile devices 140 corresponding to correlated application specific and system specific information. In an embodiment, this receiving function of the coverage area determiner 170 corresponds to stage 1010 of method 1000. These data points may be stored in storage 160. Storage 160 may also be seeded using system specific information received from other sources. Each time when identity signals from mobile device 140 are associated with a CID, nominal location and region, location database 160 also captures and stores these results. Each location point in location database 160 may also contain confidence and accuracy information associated with the location.

In embodiments, coverage area determiner 170 receives the determined centroid discussed above from an external centroid determination component, e.g., centroid determiner 156. In an embodiment, this receiving function of coverage area determiner 170 corresponds to stage 1020.

Coverage area metric determiner 350 then uses at least this information to determine one or more coverage area metrics. In an embodiment, the function of Coverage area metric determiner 350 corresponds to stage 1030. As described in embodiments below, these metrics comprise different approaches to determining the minimum geographic coverage area for a cellular site. Once the results of these metrics calculations are determined, they are forwarded to metric weight determiner 355, where weights for the results are determined and applied. In an embodiment, the function of metric weight determiner 355 corresponds to stage 1040. As described further below, in embodiments, the determined metric weights are then used by the weighted coverage estimator 360 to determine an estimate of the geographic coverage of the wireless base station. In an embodiment, the function of weighted coverage estimator 360 corresponds to stage 1050. Once the coverage estimation is completed by weighted coverage estimator 260 in embodiments, the adjusted coverage may be stored to storage device 160.

Because, as discussed above, the location samples collected through mobile applications may be biased by the application itself, the geographical characteristics of the site, as well as the errors of the location samples themselves, embodiments do not necessarily depend on a single metric. To reduce the affect of the various types of biases that may affect the data samples collected, multiple metrics are weighted and combined to generate the estimated radius.

a. Coverage Area Metric Determiner

Figure 4:
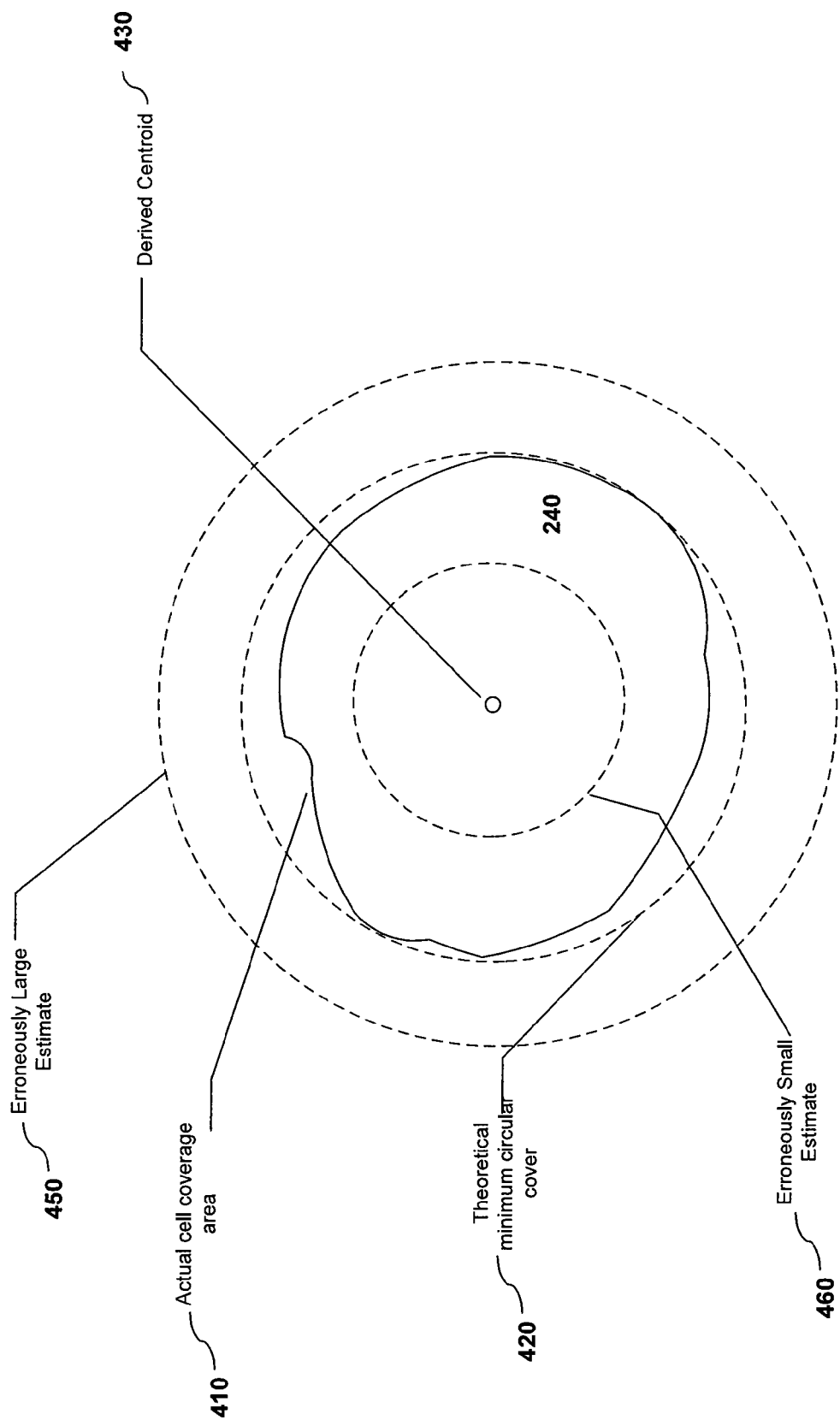
FIG. 4 is a diagram of a derived centroid and derived cellular coverage radii as determined by an embodiment of the present invention.
Figure 7A:
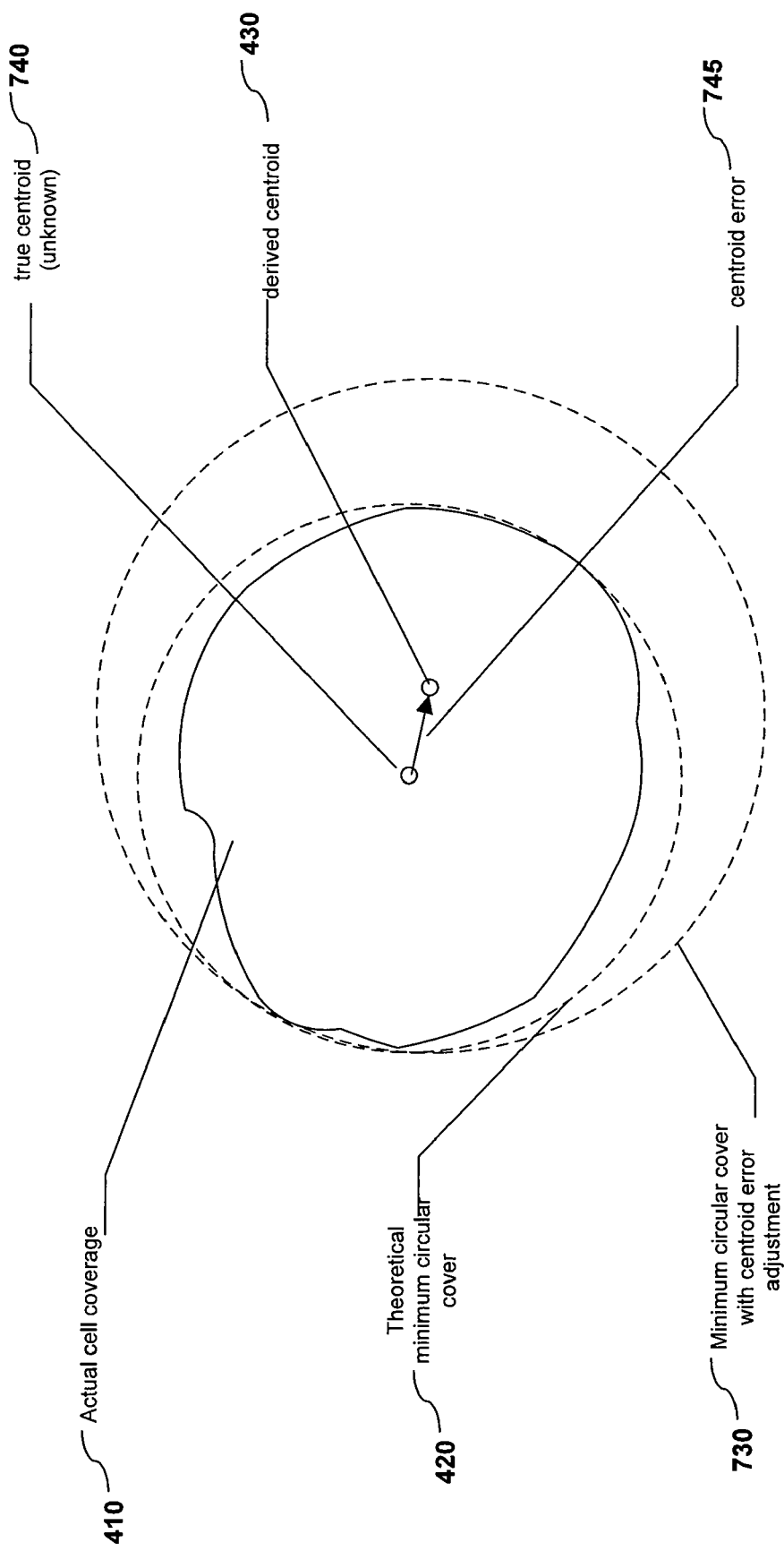
FIG. 7A is a diagram showing how a centroid error relates to various minimum circular cover estimations according to an embodiment of the present invention.

In FIG. 4, various radii are illustrated. Actual cell coverage area 410 is an irregular shape that represents the actual cell coverage area for a given cell site, while the theoretical minimum circular cover circle 420 represents the smallest circle that can encircle the entire area 410. Some embodiments described herein have the estimation of the radius of circle 420 as their most appropriate determined result. Depending upon the approaches taken by embodiments, the applications from which the data samples are collected, the distribution of the samples, and other factors the resulting estimated minimum coverage of a cell site (radius R) may be either an erroneously large estimate 450 or an erroneously small estimate 460. In addition, FIG. 4 assumes that centroid 430 is the actual geographical location of the cell site. As will be discussed with FIGS. 7A and 7B, this derived centroid may not be accurate and may need to be adjusted to improve accuracy.

In one embodiment, multiple metrics are combined to determine the estimated minimum coverage of a cell site. Sample estimation metrics include the following:
  i. Regional Estimated Cellular Coverage Radius—$R_d$
  ii. Standard Error—$\delta$
  iii. Percentile Radius—$R_\alpha$ Description of these three metrics is not intended to limit the scope of potential embodiments, rather, they are illustrative of a structure whereby one with skill in the art and familiar with the teachings herein, could use to estimate wireless site coverage radius. Additional metrics that consider additional factors with respect to the use of the collected data samples may be added using the structure taught herein. These three sample metrics are described below.

i. Regional Cellular Coverage Radius Metric—$R_d$

Embodiments may consider the cellular coverage radius within a geographic region ($R_d$) as a relevant metric for the estimation of any single cell site within that region. This metric is relevant at least because certain characteristics of a cellular site may be uniform within a particular region, e.g., the population served by sites, population density of the region and the ratio of overlapping cellular coverage among cell sites, e.g., cell towers wireless coverage that overlaps other towers from the same provider. This uniformity in characteristics may lead to uniformity in the coverage areas of the cell sites in the region as well. The regional estimated cellular site coverage radius $R_d$ is determined in part from the cell site spatial density of the cells near the region covering the determined centroid coordinate as determined above for an analyzed cell.

One approach to determining the estimated cellular sector coverage radius of one or more wireless base stations in the region, as used by embodiments, is determined with the following equation. All of the equations referenced herein are also depicted on FIG. 6.

$$R_d \approx \sqrt{\frac{TotalArea \cdot NumOfCarriers \cdot CellOverlapAvg}{\pi \cdot NumOfCells}} \quad 630$$

$R_d$=estimated cellular sector coverage radius,
TotalArea=the area (e.g., in square meters), of the region in which $R_d$ is determined
NumOfCarriers=a predetermined number of cellular carriers serving the region,
CellOverlapAvg=a predetermined estimated average number of wireless base stations whose coverage areas overlap,
NumOfCells=a predetermined estimated number of cellular sectors in the region, measured across all cellular carriers.

As described above, CellOverlapRatio is the average number of cells that have overlap in their coverage at any location of the region. One approach to estimating this CellOverlapRatio is by averaging the reports of the number of cells with signal strength above a certain operational threshold from all the data collected in the region. NumOfCarriers may be identified from public information, or estimated from the CID fields of the system information collected by the mobile applications, e.g., if 1,000 samples are collected and three carriers are referenced in the collected system specific information in the samples, the NumOfCarriers could be estimated as three. All of the equations referenced herein are depicted on FIG. 6.

Note that the accuracy of $R_d$ may be affected by the sampling rate of the cellular sectors in the region. For instance, if the sampled population is significantly less than the true population, it could result in a larger $R_d$ which in turn could result in a looser circular coverage bound, e.g., an estimated coverage area that may be larger than optimal. Note also that, due to the strong observed correlation between different cellular carrier deployment plans—particularly in densely populated areas like urban or suburban areas—it may be acceptable to extrapolate the $R_d$ of one cellular carrier to other carriers in the same region. In this case, the NumOfCarriers would equal 1. One skilled in the art, and familiar with the teachings herein, could make variations to the above equation to create a different approach to determining $R_d$ without deviation from the spirit of the invention described herein.

Also in embodiments, in a case, for example where the sample population is significantly less than the true population in a region, the radius derived from one or more well sampled cells in the region could also be used as a substitute to $R_d$, potentially taking advantage of the strong correlation of cell sector coverage sizes in a local region.

This $R_d$ radius value, the average cellular coverage radius metric, is used in a weighted equation below to determine the estimated coverage radius (R).

ii. Standard Error Metric—$\delta$

Figure 5A:
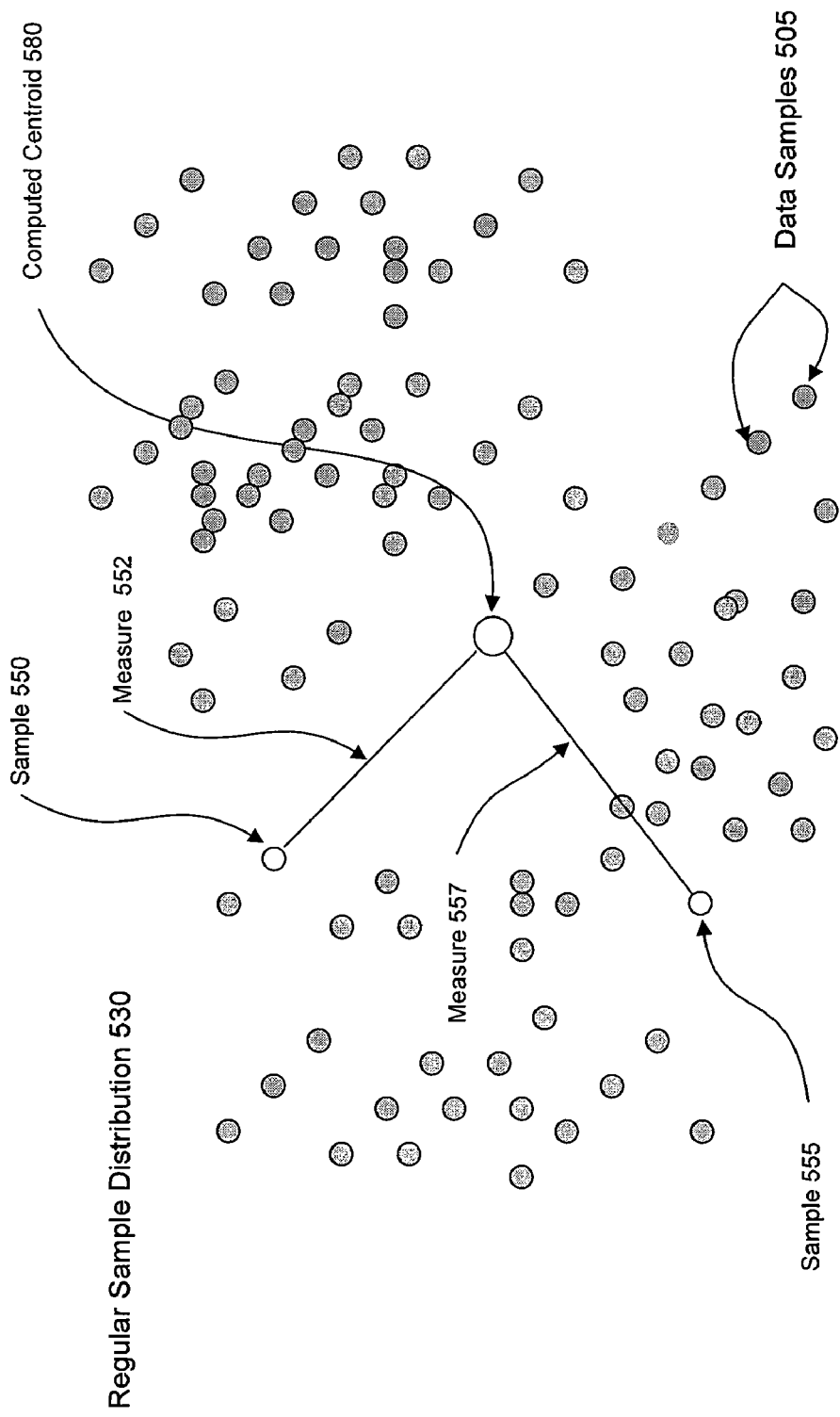
FIG. 5A is a diagram of regular sample distribution and various data sample coordinates and scalar measures according to an embodiment of the present invention.

As depicted in FIG. 5A, one type of sample collection distribution is one where the data samples 505 have a regular sample distribution 530. An example where this normal distribution of samples may be collected includes a geographic area with terrain features that lead to a generally uniform distribution of people using wireless devices across the landscape. Embodiments described herein use different techniques to assess data samples from this type of normal distribution, one such being the derivation and application of a standard error metric (S).

In embodiments, this value δ is the standard error of the sampling distribution for all data samples collected that are correlated with a particular base station. As described above, the data samples as collected by some embodiments include latitude, longitude (x,y) coordinates. For example, sample 550 and sample 555 may be collected. To facilitate the standard error determination, embodiments may convert each sample into a scalar distance from the collected coordinate to the determine centroid 580 coordinate as determined above. So for the sample 550 coordinates, scalar measure 552 is determined, and similarly for sample 555 and measure 557.

Embodiments use this value δ, the standard error of the sampling distribution for all data samples collected for a particular tower, as part of a weighted equation below to determine the estimated coverage radius (R).

iii. Percentile Radius Metric—$R_\alpha$

Figure 5B:
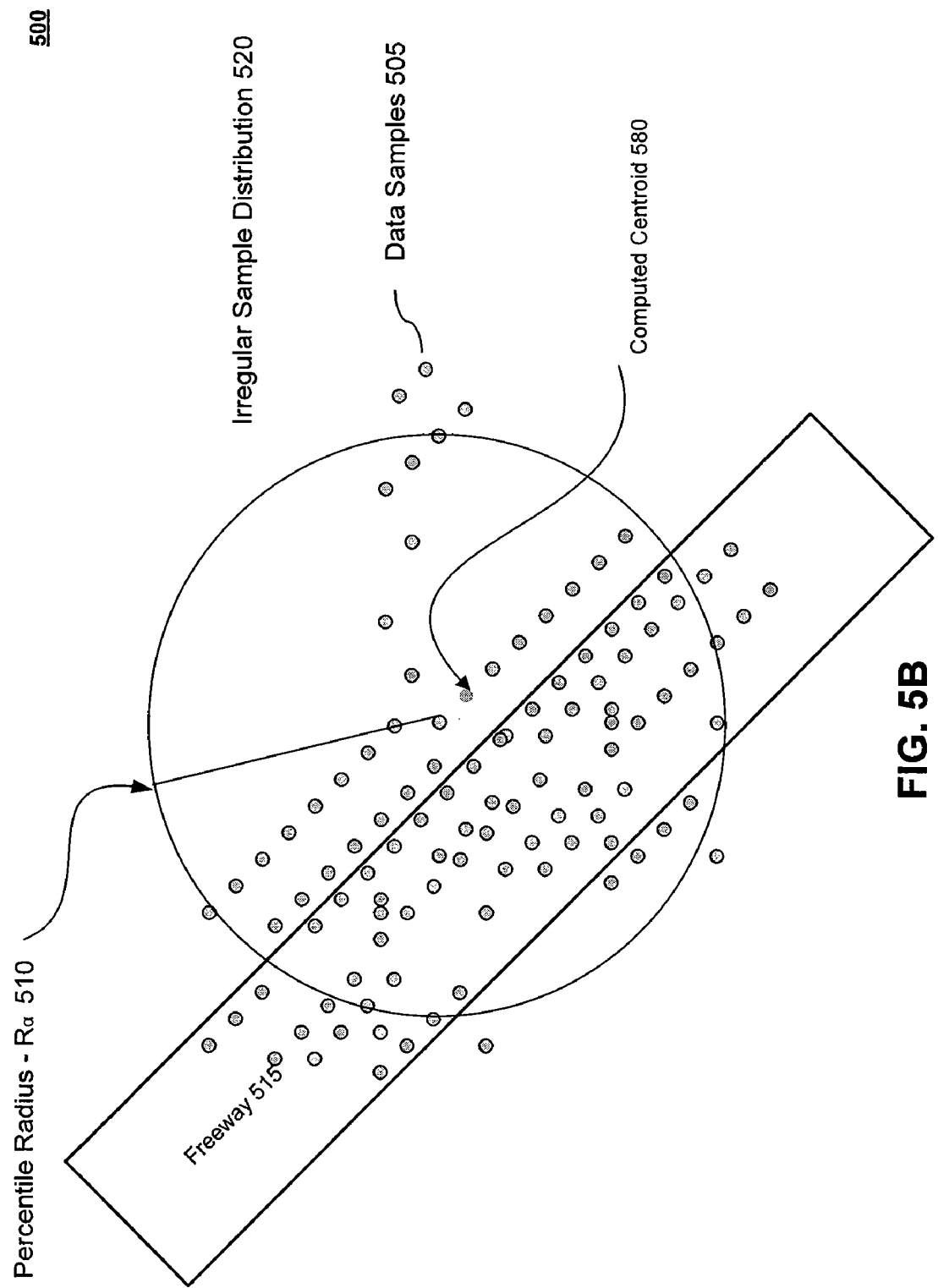
FIG. 5B is a diagram of irregular sample distribution and various data sample coordinates, scalar measures and terrain features according to an embodiment of the present invention.

FIG. 5B is directed to a type of sample collection distribution where the data samples 505 have an irregular sample distribution 520. An example where this irregular distribution of samples may be collected includes a geographic area with features that lead to a non-uniform distribution of people using wireless devices across the landscape. One such environment is one with a major travel route, e.g., freeway 515, running through it. In such an environment, the vast majority of data samples will be collected from the geographic area corresponding to the freeway. Embodiments described herein use different techniques to assess data samples from this type of irregular distribution, one such technique being the derivation of a percentile radius metric 510 ($R_\alpha$).

In embodiments, this α-percentile radius $R_\alpha$ metric may be derived using a predetermined percentile value that is set for each cellular system, region or other geographic area. In embodiments, a typical value of α is 90th percentile, but any value could be used. With the typical 90th percentile value, this would mean that, for example, if 100 samples are collected for a particular cell site, the $R_\alpha$=90 value is the radius of a circle drawn from the determined centroid coordinate, to enclose 90 of these data samples, i.e., a 90th percentile circle (90 out of 100). In other embodiments, this $R_\alpha$ value could be dynamic, based on features of the data samples, or other criteria. One with ordinary skill in the art would know that various curve-fitting techniques may be used to derive this percentile radius value.

This $R_\alpha$ radius value, the radius that would enclose a particular percentile of collected data samples from the determined centroid coordinates, is used in a weighted equation below to determine the estimated coverage radius (R).

b. Determining Weights for Each Metric

The metrics determined above may be evaluated by embodiments using a weighted analysis framework. Sample collection quality may be defined as a weighted function of many measures, including but not limited to the sample population, source device and platform diversities and spatial or temporal diversities. An example of this type of analysis framework is described in U.S. Non-Provisional patent application Ser. No. 12/324,486, filed on Nov. 26, 2008, entitled "Accuracy Analysis of Wireless Base Station Location," which is incorporated herein by reference in its entirety.

Embodiments described herein may use a metric weight determiner 255 and the equations below determine a weight for each of the above metrics based on the relative confidence in each of the values and certain other factors:

Weight of Regional Cellular Coverage Radius Metric ($R_d$):

$$w_R = 1 - \frac{1}{1 + e^{-\beta \cdot (\sqrt{p} - P)}} \qquad 640$$

p (lowercase)=the number of samples collected for a specific site.

P (uppercase)=A threshold applied to p above which the sample population is attributed with a higher level of confidence, and hence the weight of density radius $R_d$ is reduced.

In embodiments using the above equation, P is a threshold applied to p, above which the sample population is considered to have a higher level of accuracy. Once the p threshold is surpassed, the accuracy of the sample population may be deemed sufficient to reduce the weight of the regional cellular coverage area metric ($R_d$).

β=Adjusts the rate of transition near the threshold P.

Weight of Percentile Radius Metric ($R_\alpha$):

$$w_\alpha = (1 - w_r)\left(1 - e^{-\frac{\left(\frac{R_\alpha}{\delta - \gamma}\right)^2}{2\sigma^2}}\right)\left(1 - e^{-\frac{\left(\frac{R_d}{R_\alpha - \lambda}\right)^2}{2\varphi^2}}\right) \qquad 650$$

γ=the expected ratio between $R_\alpha$ and δ
λ=the expected ratio of $R_\alpha$ and $R_d$
σ and φ adjust the rate of decaying in weights when the corresponding ratio deviates from the expectations.

Weight of Standard Error Metric—δ:

$$w_\delta = \gamma(1 - w_R - w_\alpha) \qquad 660$$

γ=the expected ratio between $R_\alpha$ and δ

In embodiments, the γ-value above—the expected ratio between $R_\alpha$ and δ is predetermined, and may be selected from an analysis of multiple cell sites in the region. As would be apparent to a person skilled in the relevant art, various techniques exist for the combination and evaluation of multiple estimation metrics. Also note that discrete models with similar weight transition properties may be used in embodiments to achieve runtime performance gains.

c. Determining the Estimated Radius R for a Specific Cell Site

In embodiments, weighted coverage estimator 260 estimates radius R for a specific cell site by using the determined weights described above and from the three metrics described herein by the following equation:

$$R = (w_\delta \cdot \delta) + (w_\alpha \cdot R_\alpha) + (w_R \cdot R_d) \qquad 610$$

$w_\delta$—Weight applied to standard error (δ)
δ—Standard Error
$w_\alpha$—Weight applied to percentile radius (Rα)
Rα—Percentile Radius
$w_R$—Weight applied to average coverage radius ($R_d$)
$R_d$—Average coverage radius This equation relating to estimation accuracy is illustrative and not intended to limit the present invention. Other types of weights and combinations of weights may also be considered as would apparent to a person skilled in the art given this description.

The determined value R represents an estimate of the radius of minimum geographic coverage of a cellular site. As described below, embodiments may use various approaches to coverage adjustment that may improve the accuracy of this value.

V. COVERAGE ADJUSTMENT

In embodiments, coverage adjuster 270 may be configured to adjust the derived coverage radius R based on different factors. In an embodiment, the function of coverage adjuster 270 corresponds to stage 1060. Once the coverage estimation is completed by coverage adjuster 270 in embodiments, the adjusted coverage may be stored to storage device 160. In an embodiment, this storing function of coverage adjuster 270 corresponds to stage 1070.

a. Coverage Adjustment Based on Estimated Centroid Error

One factor that may be used to adjust the derived coverage is an error in the centroid determination. In embodiments, the radius calculations above derive an estimated radius (R) of the wireless coverage area. This radius however, as described above and as depicted on FIG. 7A, is centered upon the determined centroid 430 coordinates, as derived above from the sample population. To improve the accuracy of the final estimate, one embodiment adjusts the estimated coverage radius (R) to mitigate the effects of an error in the centroid determination. In embodiments, the goal of this step is to adjust the derived centroid 430 so as to have it closer to the true centroid 740.

One approach to determining the centroid error 745 ($R_e$) uses the standard error δ, and the size of the sample population. The determined centroid error may then be added to the determined R-value radius from above.

$$R_e = \delta/\sqrt{p} \qquad 670$$

The adjusted radius would be R+$R_e$. 620

Figure 7B:
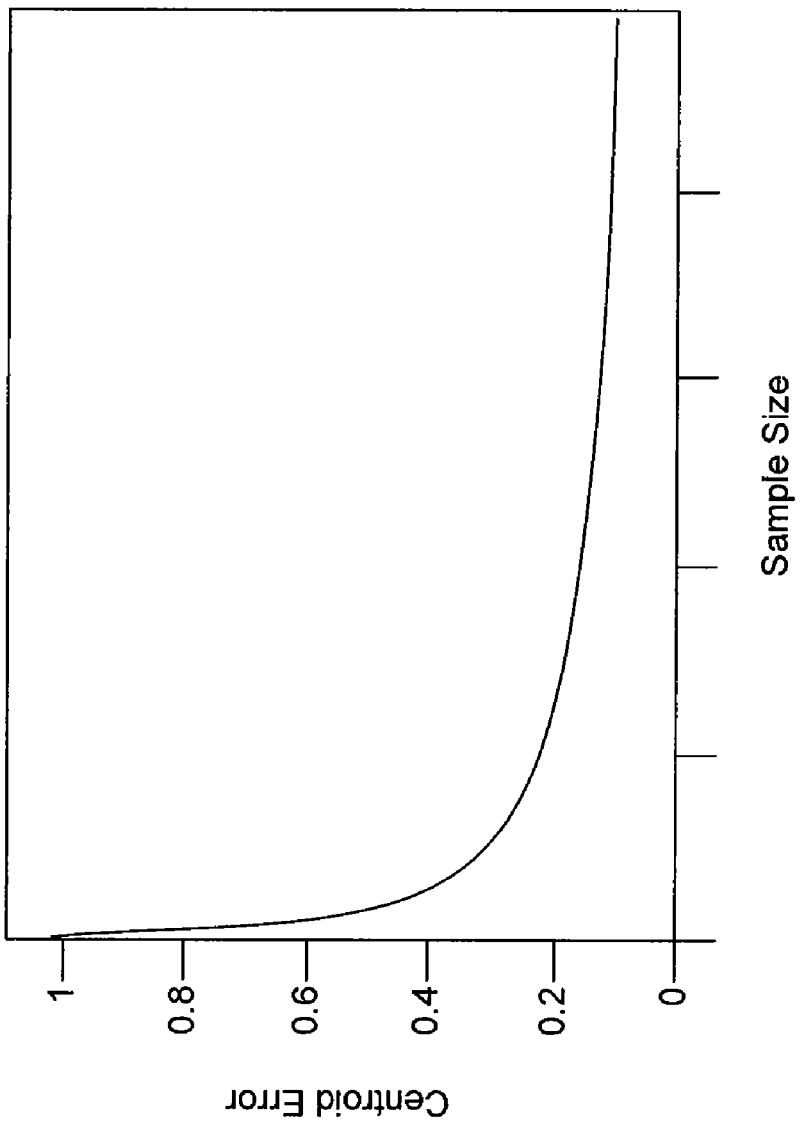
FIG. 7B is a chart showing the relationship of centroid error to sample size.

FIG. 7B shows a chart of a relationship between centroid error and the size of the data sample.

The general result of applying the approach shown above is to enlarge the previously determined radius R. Thus the previous goal theoretical minimum circular cover becomes a minimum circular cover with centroid error adjustment 730. This adjustment in the determined radius of coverage may ensure a full estimate of the cellular sector coverage with higher level of confidence. One skilled in the art, and familiar with the teachings herein, could develop alternative adjustments to the R-value or additional adjustments to account for centroid errors, and not depart from the spirit of embodiments described herein.

b. Coverage Adjustment Based on Terrain

As described above in the discussion of the percentile radius metric ($R_\alpha$) the sample collection distribution may have an irregular distribution. For example, in some of the places like San Francisco, the terrain has complex characteristics, such as a high variation of elevations. Also, as discussed above at FIG. 5B an irregular distribution of samples may be caused by the presence of a well-used freeway 515. Topological features such as hill 810 may also cause irregular distribution. In addition, hills for example have an added effect of distorting the significance of the data samples collected nearby. Having a large hill 810 between the collecting wireless device 820 and the cell site 140 may distort the significance of the measured signal strength.

All of the above features may distort the actual usable or popularly used coverage of the cellular sectors from its actual coverage or expected coverage. To address these effects, coverage adjustment may be based on terrain characteristics, elevation model and population inference from map features, e.g., roads, dense housing areas, and other similar items. To facilitate this coverage adjustment, embodiments may extract map information from mapping applications like the Google Maps and Google Earth, by Google Inc. This information, when incorporated into the metric analysis above, may be used to subsequently modify the derived radius size. In addition, mapping information may also shift the coordinates of the derived centroid.

VI. EXAMPLE COMPUTER SYSTEM IMPLEMENTATION

Figure 9:
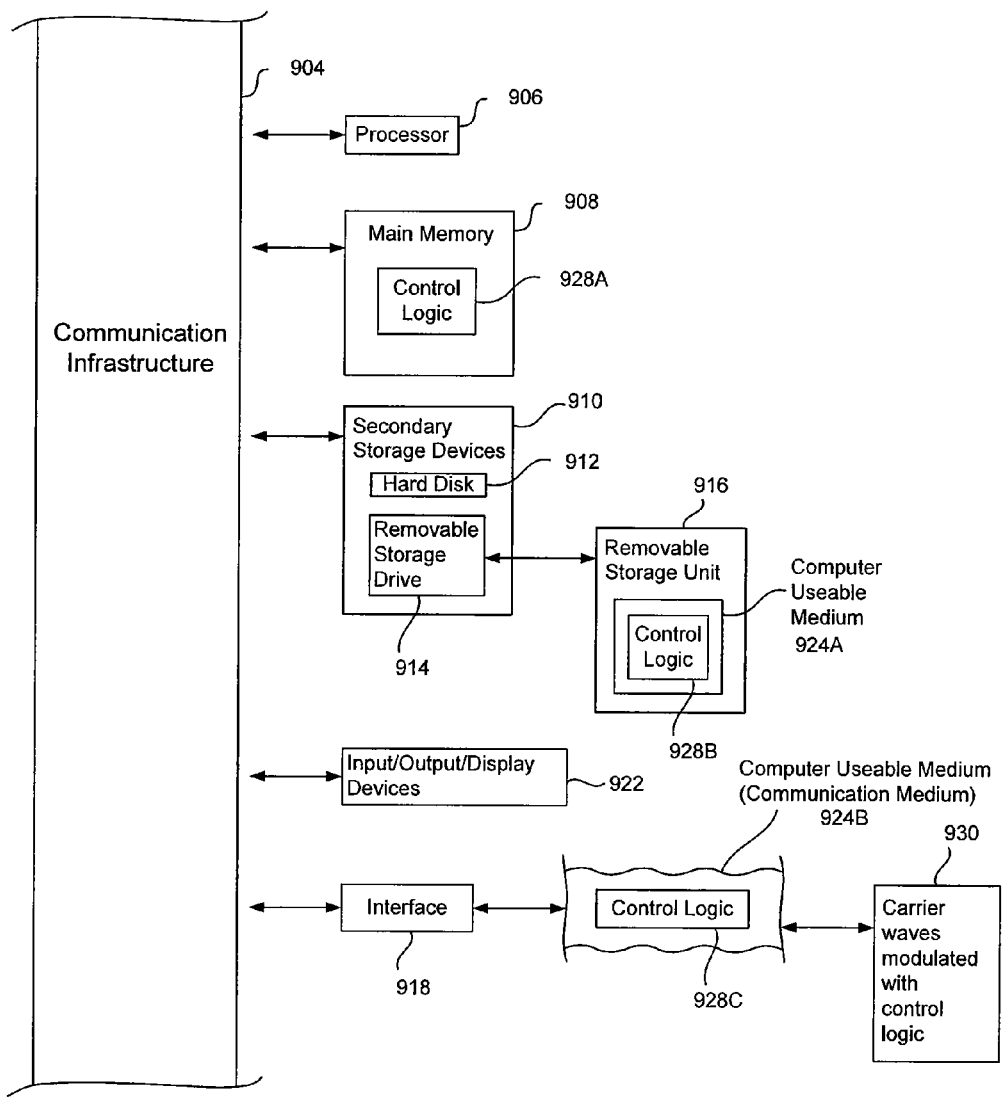
FIG. 9 depicts a sample computer system that may be used to implement embodiments of the present invention.

Embodiments described herein may be implemented using hardware, software or a combination thereof and may be implemented in a computer system or other processing system. Hardware, software or any combination of such may embody any of the modules in FIGS. 1A-C, 3 and any stage in FIG. 10. In an embodiment, the invention is directed toward a computer program product executing on a computer system capable of carrying out the functionality described herein. This applies to any of the servers and/or clients in system 100. An example of a computer system 900 is shown in FIG. 9. Computer system 900 includes one or more processors, such as processor 906. Processor 906 is connected to a communication bus 904. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM), and may also include a secondary memory 910. Secondary memory 910 may include, for example, a hard disk drive 912 and/or a removable storage drive 914, representing a floppy disk drive, a magnetic tape drive, an optical disk drive, etc. Removable storage drive 914 reads from and/or writes to a removable storage unit 918 in a well-known manner. Removable storage unit 918, represents magnetic tape, optical disk, memory card, etc. which is read by and written to by removable storage drive 914. As will be appreciated, removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a removable memory chip (such as an EPROM, or PROM) and associated socket, and other removable storage units 922 and interfaces 920 which allow software and data to be transferred from removable storage unit 922 to computer system 900.

Computer system 900 may also include a communication interface 924. Communication interface 924 enables computer system 900 to communicate with external and/or remote devices. For example, communication interface 924 allows software and data to be transferred between computer system 900 and external devices. Communication interface 924 also allows computer system 900 to communicate over communication networks, such as LANs, WANs, the Internet, etc. Communication interface 924 may interface with remote sites or networks via wired or wireless connections. Examples of communications interface 924 may include a modem, a network interface (such as an Ethernet card), a communications port, a PCMCIA slot and card, etc. Computer system 900 receives data and/or computer program products via communication network 924. Software and data transferred via communications interface 924 are in the form of signals 928 which may be electronic, electromagnetic, optical or other signals capable of being received by communications interface 924. Signals 928 are provided to communications interface 924 via a communications path (i.e., channel) 926. This channel 926 carries signals 928 and may be implemented using wire or cable, fiber optics, a phone line, a cellular phone link, an RF link and other wired or wireless communications channels.

In this document, the terms "computer program medium" and "computer usable medium" are used to generally refer to media such as removable storage drive 914, and a hard disk installed in hard disk drive 912. These computer program products are means for providing software to computer system 900.

Computer programs (also called computer control logic) are stored in main memory 908 and/or secondary memory 910. Computer programs may also be received via signal 928 and communications interface 924. Such computer programs, when executed, enable computer system 900 to perform the features of the present invention as discussed herein. In particular, the computer programs, when executed, enable processor 906 to perform the features of the present invention. Accordingly, such computer programs represent controllers of computer system 900.

In an embodiment where the invention is implemented using software, the software may be stored in a computer program product and loaded into computer system 900 using removable storage drive 914, hard disk drive 912 or communications interface 924. The control logic (software), when executed by processor 906, causes processor 906 to perform the functions of the invention as described herein.

Computer system 900 also includes input/output/display devices 932, such as monitors, keyboards, pointing devices, etc.

The invention may work with software, hardware, and operating system implementations other than those described herein. Any software, hardware, and operating system implementations suitable for performing the functions described herein may be used.

Finally, in FIG. 10, a method used, in an embodiment, of determining the minimum geographic coverage area for a wireless base station is depicted in a flowchart 1000. In step 1010, in an embodiment, the first step is to receive one or more data samples from one or more mobile devices. Next, in an embodiment, in step 1020, receive a derived centroid that represents an estimate of the geographic coordinates of the wireless base station. Then, in an embodiment, in step 1030, determine one or more coverage area metrics from the data samples. In step 1040, in an embodiment, determine a weight for each of the one or more coverage area metrics. Next, in step 1050, in an embodiment, determine a minimum geographic coverage area for the wireless base station based at least on the one or more coverage area metrics and the weight associated with each metric. After step 1050, in an embodiment, in step 1060, adjust the determined minimum geographic coverage based at least on a centroid error correction determined at least by analyzing the standard error of the data samples and the size of the data sample population. Finally, in an embodiment, in step 1070, store the adjusted coverage area to a storage device.

VII. CONCLUSION

Embodiments described herein provide methods and systems for estimating the minimum coverage of cellular sectors. The minimum coverage of a cellular site may be determined based on data obtained from one or more mobile devices.

The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. An apparatus for determining a minimum coverage area of a wireless base station, the apparatus comprising:
    a coverage area metrics determiner configured to determine at least two coverage area metrics based on received data samples and a determined centroid, such centroid corresponding to an estimate of the location of the wireless base station;
    a metrics weight determiner configured to determine a respective weight for each determined coverage area metric;
    a weighted coverage determiner configured to determine a minimum geographic coverage area for the wireless base station based on the coverage area metrics and the respective weight associated with each determined coverage area metric;
    a coverage adjuster configured to adjust the determined minimum geographic coverage based on received terrain information corresponding to geographic terrain features of a geographic area of the received data samples; and
    a storage device configured to store the adjusted minimum coverage area.

2. The apparatus of claim 1 wherein at least one of the determined coverage area metrics comprises a regional cellular coverage radius metric.

3. The apparatus of claim 1 wherein at least one of the determined coverage area metrics comprises a standard error metric.

4. The apparatus of claim 1 wherein at least one of the determined coverage area metrics comprises a percentile radius metric.

5. The apparatus of claim 1, wherein one of the received data samples comprises location information having geographical coordinates determined by a Global Positioning System (GPS) device.

6. The apparatus of claim 1, wherein one of the received data samples comprises location information having geographical coordinates determined by passive radio location technology.

7. The apparatus of claim 1, wherein one of the received data samples comprises information broadcast from a wireless base station and received by the mobile device.

8. The apparatus of claim 1, wherein one of the received data samples comprises an identifier that uniquely identifies the wireless base station.

9. The apparatus of claim 1, wherein the coverage area metrics determiner is further configured to determine a coverage area metric for the wireless base station using an estimated coverage area metric for another wireless base station.

10. A method of determining, with a processor, the minimum geographic coverage area for a wireless base station, the method comprising:
- receiving at least two data samples from at least one mobile device;
- receiving a determined centroid from a centroid determiner, such centroid corresponding to an estimate of the location of the wireless base station;
- determining at least two coverage area metrics from the data samples;
- determining a respective weight for each determined coverage area metric;
- determining a minimum geographic coverage area for the wireless base station based at least on the determined coverage area metrics and the respective weight associated with each determined coverage area metric;
- adjusting the determined minimum geographic coverage based on received terrain information corresponding to geographic terrain features of a geographic area of the received data samples; and
- storing the adjusted geographic coverage area to a storage device.

11. A system for determining the minimum geographic coverage area for a wireless base station, the system comprising:
- means for receiving at least one data sample from at least one mobile device;
- means for receiving a derived centroid from a centroid determiner, such centroid corresponding to an estimate of the location of the wireless base station;
- means for determining at least two coverage area metrics from the at least one data sample;
- means for determining a respective weight for each determined coverage area metric;
- means for determining a minimum geographic coverage area for the wireless base station based at least on the determined coverage area metrics and the respective weight associated with each determined coverage area metric;
- means for adjusting the determined minimum geographic coverage based at least on a centroid error correction determined at least by analyzing the standard error of the data samples and the size of the data sample population; and
- means for storing the adjusted coverage area to a storage device.

12. A non-transitory computer-readable medium having computer-readable instructions encoded thereon that, when executed by a processor cause the processor to:
- receive at least two data samples from at least one mobile device;
- receive a determined centroid from a centroid determiner, such centroid corresponding to an estimate of the location of the wireless base station;
- determine at least two coverage area metrics from the data samples;
- determine a respective weight for each determined coverage area metric;
- determine a minimum geographic coverage area for the wireless base station based at least on the coverage area metrics and the respective weight associated with each coverage area metric;
- adjust the determined minimum geographic coverage based on received terrain information corresponding to geographic terrain features of a geographic area of the received data samples; and
- store the adjusted geographic coverage area to a storage device.

13. A method of determining the minimum geographic coverage area for a wireless base station, comprising:
- receiving at least two data samples from at least one mobile device;
- receiving a derived centroid from a centroid determiner, such centroid corresponding to an estimate of the location of the wireless base station;
- determining at least two coverage area metrics from the data samples;
- determining a respective weight for each determined coverage area metric;
- determining a minimum geographic coverage area for the wireless base station based at least on the coverage area metrics and the respective weight associated with each coverage area metric;
- adjusting the determined minimum geographic coverage based at least on a centroid error correction determined at least by analyzing the standard error of the data samples and the size of the data sample population; and
- storing the adjusted geographic coverage area to a storage device.

* * * * *